Patented Jan. 17, 1939

2,144,067

UNITED STATES PATENT OFFICE 2,144,067

SPLINTERLESS GLASS

Georg Kränzlein, Frankfort - on - the - Main-Hochst, Germany, assignor to I. G. Farbenindustrie Aktiengesellschaft, Frankfort-on-the-Main, Germany No Drawing. Application December 17, 1934, Serial No. 757,972. In Germany April 17, 1930

5 Claims. (Cl. 49—81)

The present invention relates to splinterless materials, particularly to splinterless glass.

I have found that splinterless materials can easily be made from inorganic fused masses of all kinds, by treating said masses with the products obtainable by the polymerization of mixtures of unsaturated organic compounds capable of being polymerized. There may be used, for instance, polymerized products obtained by mixing and polymerizing vinyl esters with each other or by mixing and polymerizing vinyl esters with other substances capable of being polymerized. These polymerization products possess a high elasticity and the safety glass prepared therewith is extremely resistant to shocks.

The polymerized products obtained by polymerizing vinyl esters and acrylic acid esters have been found to be particularly useful; furthermore there may be used polymerized products obtained by mixing and polymerizing vinyl acetate and vinyl chloroacetate, vinyl acetate and vinyl benzoate, vinyl acetate and butadiene, vinyl benzoate and isoprene, vinyl ethyl ether and acroleine, styrene and acroleine, styrene and cinnamic methyl ester.

Furthermore I have found that there may be added to the unsaturated organic substances polymerized either alone or in mixture with each other the adhesive to gummous reaction products obtainable by a more or less advanced reaction between polybasic organic acids and organic compounds containing at least one hydroxyl group and preferably at least three carbon atoms, such as the condensation products of maleic anhydride, phthalic acid, citric acid and the like with butylene glycol, castor oil, glycerin, sorbite and the like. By the addition of these substances to polymerization products especially of compounds containing the group $H_2C=C<$ and of mixtures thereof, splinterless materials can be made, showing an improved elasticity, adhesive power and fastness to the action of cold. Furthermore, softening agents may be added.

Safety glass is, for instance, prepared by spreading the molten, softened or dissolved mass in a thin layer on two sheets of glass, superposing the two sheets and pressing them together at a raised temperature and under a moderate pressure, a formation of air bubbles between the sheets having to be avoided. After cooling, the sheets can immediately be cut and further be used.

Instead of glass other splintering materials, for instance enamel, porcelain or the like may be used. Also splinterless materials, such as metallic discs, can thus be united with splintering materials, such as glass.

The products obtainable by the new process are distinguished by a considerably reduced capability of splintering, while the other properties of the material in question are not unfavorably influenced. When so-called safety glass is made, the transparency, for instance, is by no means diminished.

The following examples serve to illustrate my invention, but they are not intended to limit it thereto, the parts being by weight:

1. A mixture of 40 parts of vinyl chloride and 60 parts of vinyl acetate is polymerized at temperatures slowly rising from about 40° C. to about 80° C. while applying pressure. The polymerization product is applied in a finely reduced condition on two sheets of glass upon which the resin fuses when heated to a temperature of 120° C. and a clearly transparent layer is obtained. The resin layers of the two glass plates are superposed and the whole is pressed together at a temperature of 80° C. and under a pressure of 5 atmospheres; care has to be taken that no air bubbles are contained in the resin. A safety glass is obtained which is extremely resistant to shocks.

2. Vinyl chloride and acrylic acid ethyl ester in molecular proportions are polymerized and a highly viscous limpid product is obtained which is dissolved. The solution is caused to evaporate and the film thus obtained is applied on a glass plate. A second plate of glass is superposed and both plates are pressed together at a temperature of between about 50° C. and 70° C. With the aid of a softening agent, such as tributylphosphate, there is attained a good adhesion of the film on the sheets of glass, no air bubbles being formed. A safety glass is thus produced which is distinguished particularly by a high resistance to splintering in the cold, even at a temperature below —20° C.

3. The polymerization product obtained by a conjoint polymerization of 75 parts of vinyl chloride and 25 parts of acrylic acid methyl ester is rolled out in the form of powder at about 70° C. to 90° C. so as to obtain a limpid film. The films may also be obtained by shaping the polymerization mass into blocks, while applying a high pressure, and cutting therefrom thin films of a thickness of about 1 mm. to 1.2 mm. The films thus prepared are pressed with the aid of an adhesive or a softening agent (dibutyl phthalate) between two sheets of glass, while applying pressure and heat, so that a homogeneous adhesion free from bubbles is attained. The safety glass obtained possesses a high resistance to splintering. It is very resistant towards shocks and only breaks, when highly strained, while the glass splinters adhere to the layer of the film.

4. A limpid film which is free from bubbles is prepared in a manner similar to that described in the preceding example from a polymerization product obtained by a conjoint polymerization of 60 parts of vinyl chloride and 40 parts of vinyl acetate; the film may also be prepared by dissolving the solvent and causing the solution to evaporate. The film is then coated on both sides with an adhesive layer, for instance a softening agent and then pressed between two plates of glass, a safety glass resistant to splintering and having similar properties as the safety glass of the preceding example being obtained, while avoiding the formation of air bubbles.

5. The polymerization product obtained by polymerizing 80 parts of vinyl chloride together with 20 parts of vinyl butyrate is dissolved in a mixture of acetone and an ester of a high boiling point (ethyl butyrate) and the solution is caused to evaporate until a limpid film having a thickness of 0.8 mm. is formed. Any rest of the solvent is removed by a treatment under reduced pressure. The film obtained is placed between two sheets of glass which are pressed together as described in the preceding examples. There is obtained a safety glass having a high resistance to splintering not only at extremely high, but also at extremely low temperatures.

This application is a continuation-in-part of my copending application Serial No. 530,733 filed April 16, 1931.

I claim:
1. Splinterless glass consisting of two sheets of glass having interposed therebetween as a binding agent to secure adhesion of the glass sheets a product of the conjoint polymerization of vinyl chloride and another compound having the vinyl group.

2. Splinterless glass consisting of two sheets of glass having interposed therebetween as a binding agent to secure adhesion of the glass sheets a product of the conjoint polymerization of vinyl chloride and an organic vinyl ester.

3. Splinterless glass consisting of two sheets of glass having interposed therebetween as a binding agent to secure adhesion of the glass sheets a product of the conjoint polymerization of vinyl chloride and an acrylic acid ester.

4. Splinterless glass consisting of two sheets of glass having interposed therebetween as a binding agent to secure adhesion of the glass sheets a product of the conjoint polymerization of vinyl chloride and vinyl acetate.

5. Splinterless glass consisting of two sheets of glass having interposed therebetween as a binding agent to secure adhesion of the glass sheets a product of the conjoint polymerization of vinyl chloride and vinyl butyrate.

GEORG KRÄNZLEIN.